United States Patent
Liu et al.

(10) Patent No.: US 12,219,953 B2
(45) Date of Patent: Feb. 11, 2025

(54) PRESSURE SELF-CONTROLLED IRRIGATION AND PESTICIDE APPLICATION SPRINKLER FOR MICRO-IRRIGATION SYSTEM

(71) Applicant: Jiangsu University, Jiangsu (CN)

(72) Inventors: Junping Liu, Jiangsu (CN); Xingye Zhu, Jiangsu (CN); Shouqi Yuan, Jiangsu (CN); Xinjian Wang, Jiangsu (CN); Qingsong Liu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/574,303

(22) PCT Filed: Jan. 7, 2022

(86) PCT No.: PCT/CN2022/070669
§ 371 (c)(1),
(2) Date: Dec. 27, 2023

(87) PCT Pub. No.: WO2023/092832
PCT Pub. Date: Jun. 1, 2023

(65) Prior Publication Data
US 2024/0284893 A1    Aug. 29, 2024

(30) Foreign Application Priority Data
Nov. 23, 2021 (CN) .......................... 202111390889.5

(51) Int. Cl.
*A01M 7/00* (2006.01)
*B05B 1/30* (2006.01)

(52) U.S. Cl.
CPC ............... *A01M 7/005* (2013.01); *B05B 1/30* (2013.01)

(58) Field of Classification Search
CPC ........ A01M 7/005; B05B 1/03; B05B 1/3006; B05B 12/085
(Continued)

(56) References Cited

U.S. PATENT DOCUMENTS 3,058,670 A * 10/1962 Marotto .................. B05B 1/308
239/542
3,863,845 A     2/1975 Bumpstead
(Continued)

FOREIGN PATENT DOCUMENTS

CN        107242108      10/2017
CN        109258409      1/2019
(Continued)

OTHER PUBLICATIONS

DE-102007054673-A1—Foreign Document Translation (Year: 2009).*
(Continued)

*Primary Examiner* — Steven M Cernoch
(74) *Attorney, Agent, or Firm* — JCIPRNET

(57) ABSTRACT

A pressure self-controlled irrigation and pesticide application sprinkler for a micro-irrigation system, the sprinkler mainly including a sprinkler body, a sprinkler cap, a spring sleeve, flow guide holes, a spring washer, a mist spraying nozzle, a rotary acceleration chamber, a compressible spring, arc-shaped flow passages, a thread, a deflection surface, an engagement recess, flow guide slots, a connecting rod movable hole, and a connecting rod. The sprinkler is configured as a double-flow-passage structure. The sprinkler body is provided therein with the spring sleeve and the spring washer. Water flow pressure is controlled to push the spring washer to drive the spring sleeve to move vertically, thereby achieving the switching between two operating modes, i.e., irrigation and mist spraying.

6 Claims, 2 Drawing Sheets

(58) Field of Classification Search
USPC .......................... 239/443–449, 542, 438–441
See application file for complete search history.

(56) References Cited

U.S. PATENT DOCUMENTS

| | | | | |
|---|---|---|---|---|
| 7,581,685 | B2 * | 9/2009 | Belisle | ................ B05B 1/1609 |
| | | | | 239/443 |
| 11,027,293 | B2 * | 6/2021 | Votteler | ................ B05B 1/267 |

FOREIGN PATENT DOCUMENTS

| | | | | |
|---|---|---|---|---|
| CN | 213095380 | | 5/2021 | |
| CN | 113615668 | | 11/2021 | |
| DE | 102007054673 | A1 * | 5/2009 | ........... B05B 1/1609 |
| RU | 2129775 | | 5/1999 | |

OTHER PUBLICATIONS

"International Search Report (Form PCT/ISA/210) of PCT/CN2022/070669", mailed on May 9, 2022, with English translation thereof, pp. 1-4.

Office Action of China Counterpart Application, with English translation thereof, issued on Nov. 8, 2022, pp. 1-7.

* cited by examiner

PRESSURE SELF-CONTROLLED IRRIGATION AND PESTICIDE APPLICATION SPRINKLER FOR MICRO-IRRIGATION SYSTEM

CROSS-REFERENCE TO RELATED APPLICATION

This application is a 371 of international application of PCT application serial no. PCT/CN2022/070669, filed on Jan. 7, 2022, which claims the priority benefit of China application no. 202111390889.5, filed on Nov. 23, 2021. The entirety of each of the above-mentioned patent applications is hereby incorporated by reference herein and made a part of this specification.

TECHNICAL FIELD

The present disclosure relates to the technical field of agricultural micro-irrigation, specifically to a key device for the integration of irrigation and pesticide application in a crop irrigation system of forestry and fruit industry, and more specifically to a pressure self-controlled irrigation and pesticide application sprinkler for a micro-irrigation system.

DESCRIPTION OF RELATED ART

At present, there are serious problems such as low utilization rate of water and soil resources and non-point source pollution of pesticides and chemical fertilizers in orchards. For fruit crops with a wide range and a large amount, such as grapes, irrigation is mainly carried out using a micro-irrigation system, and pesticide application is mainly carried out manually or partially through separate operation. Such a pesticides application method has the shortcomings such as high drift loss of pesticides and high costs, and harms people's health. Therefore, the integration of irrigation and pesticide application in the same micro-irrigation system can realize the irrigation function and the pesticide spraying function, save time and labor, conserve energy, and improve the pesticide utilization efficiency. The integration of irrigation and pesticide application in the same micro-irrigation system requires the sprinkler at the end of the system to realize the two functions. However, the functions of conventional sprinkler products are limited. A micro sprinkler can provide only the irrigation function. An atomization sprinkler can provide only the pesticide application function. As a result, irrigation and pesticide application cannot be both realized in a single system. In view of the above problems, it is necessary to develop a multifunctional sprinkler having a simple structure and integrating irrigation and pesticide application. Therefore, the present disclosure provides a multifunctional sprinkler integrating irrigation and pesticide application and can automatically switch between an irrigation mode and an pesticide application mode under control of pressure, so that in a same micro-irrigation system, the sprinkler irrigates the roots of crops under a low-pressure condition (higher than 100 kPa and lower than 200 kPa), and sprays a pesticide to the leaves of crops under a medium-pressure condition (higher than 200 kPa and lower than 400 kPa).

It is found through search that so far, there is no report or patent concerning such a design.

SUMMARY

An objective of the present disclosure is to provide a pressure self-controlled irrigation and pesticide application sprinkler for a micro-irrigation system. An outlet flow path of the sprinkler is changed by a change in supply pressure, to switch between water spraying and pesticide spraying. In this way, the sprinkler irrigates the roots of crops under a low-pressure condition (higher than 100 kPa and lower than 200 kPa), and sprays a pesticide to the leaves of crops under a medium-pressure condition (higher than 200 kPa and lower than 500 kPa), i.e., the sprinkler integrates an irrigation function and a pesticide application function which are automatically controlled.

To achieve the above objective, the following technical solutions are adopted in the present disclosure. A pressure self-controlled irrigation and pesticide application sprinkler for a micro-irrigation system is provided, which includes a sprinkler body and a sprinkler cap. An impact deflection surface is arranged at a joint between the sprinkler body and the sprinkler cap. A spring sleeve is mounted in an inner cavity of the sprinkler body. The spring sleeve is slidable on a surface of the inner cavity of the sprinkler body. A bottom of the spring sleeve is in communication with a water inlet of the sprinkler body. A plurality of arc-shaped flow passages are arranged on the sprinkler body. The arc-shaped flow passages are in communication with the inner cavity of the sprinkler body. A plurality of through holes are arranged on a side wall of the spring sleeve. A connecting rod is fixed inside the spring sleeve. A spring washer is arranged on the connecting rod. The spring washer is located at a water outlet of the sprinkler body. An upper end of the sprinkler cap is provided with a spraying nozzle. A cylindrical rotary acceleration chamber and a spring cavity are provided in the sprinkler cap. A connecting rod movable hole and a plurality of flow guide grooves are provided in the cylindrical rotary acceleration chamber. The connecting rod is slidably connected to the connecting rod movable hole. A compressible spring is arranged in the spring cavity. The compressible spring is nested on the connecting rod. Two ends of the compressible spring are positioned through the spring washer and a bottom end surface of the rotary acceleration chamber.

In the above solution, a flow guide hole is arranged at an outlet of each of the arc-shaped flow passages, and an outlet of the flow guide hole is exactly opposite to the impact deflection surface.

In the above solution, a central hole axis of each of the through holes is coplanar with a center line of each of the arc-shaped flow passages, and a diameter of each of the through holes is equal to a flow passage diameter of each of the arc-shaped flow passages.

In the above solution, an engagement recess is provided on a wall surface of the inner cavity of the sprinkler body, a protrusion is arranged on an outer wall surface of the spring sleeve, and the protrusion is located in the engagement recess.

In the above solution, a water inlet end of the sprinkler body is connected to a water pipe through a thread.

In the above solution, a diameter of the spring washer is greater than a diameter of a flow passage of the water outlet of the sprinkler body.

The present disclosure has the following beneficial effects. When the sprinkler operates under a low-pressure condition, a pressure exerted by water on the spring washer is less than an elastic force of the compressible spring, and the water flows out of the flow guide holes through the arc-shaped flow passages of the sprinkler body. Whereby, an irrigation function is realized. When the sprinkler operates under a medium-pressure condition, the pressure exerted by the water on the spring washer is greater than the elastic force of the compressible spring, and the compressible spring is compressed. The spring washer drives, through the connecting rod, the entire spring sleeve to move upward and block the arc-shaped flow passages, and the water flow flows out from the flow guide grooves of the sprinkler cap. Whereby, a pesticide spraying function is realized. The automatic switching between irrigation and pesticide spraying modes is realized through the control of the pressure exerted on the spring, so the intelligent level is improved.

DESCRIPTION OF THE EMBODIMENTS

The present disclosure will be described further in detail below with reference to the accompanying drawings and embodiments, but the protection scope of the present disclosure is not limited thereto.

Figure 1:
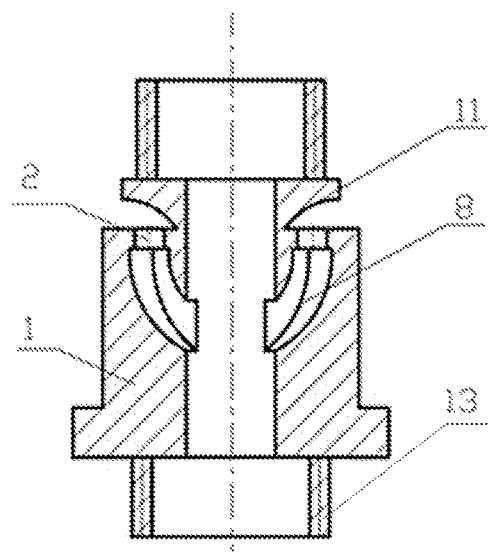
FIG. 1 is a schematic cross-sectional front view of a sprinkler body.
Figures 2, 3:
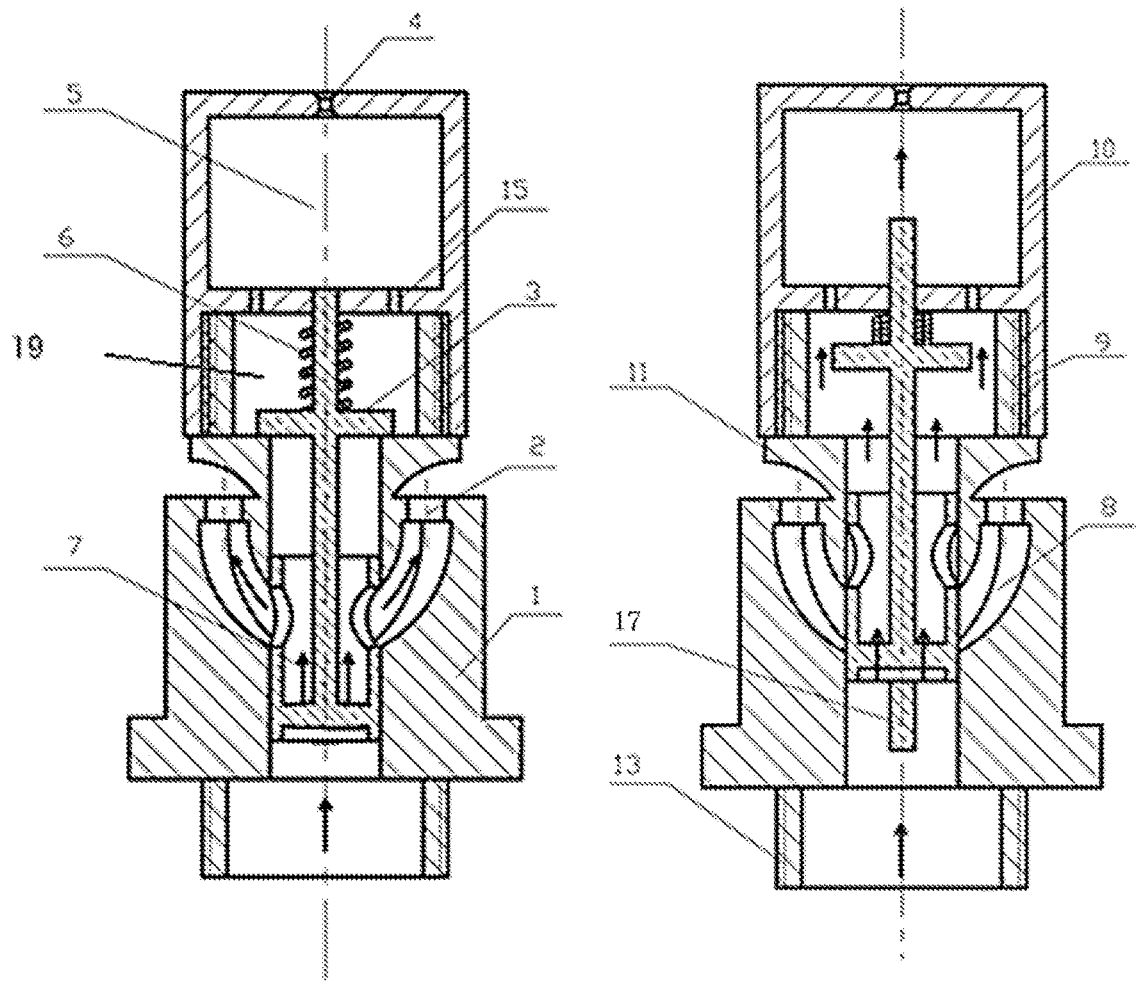
FIG. 2 is a schematic diagram of the present disclosure operating in a water spraying mode under a low-pressure condition.
FIG. 3 is a schematic diagram of the present disclosure operating in a mist spraying mode under a medium-pressure condition.
Figure 4:
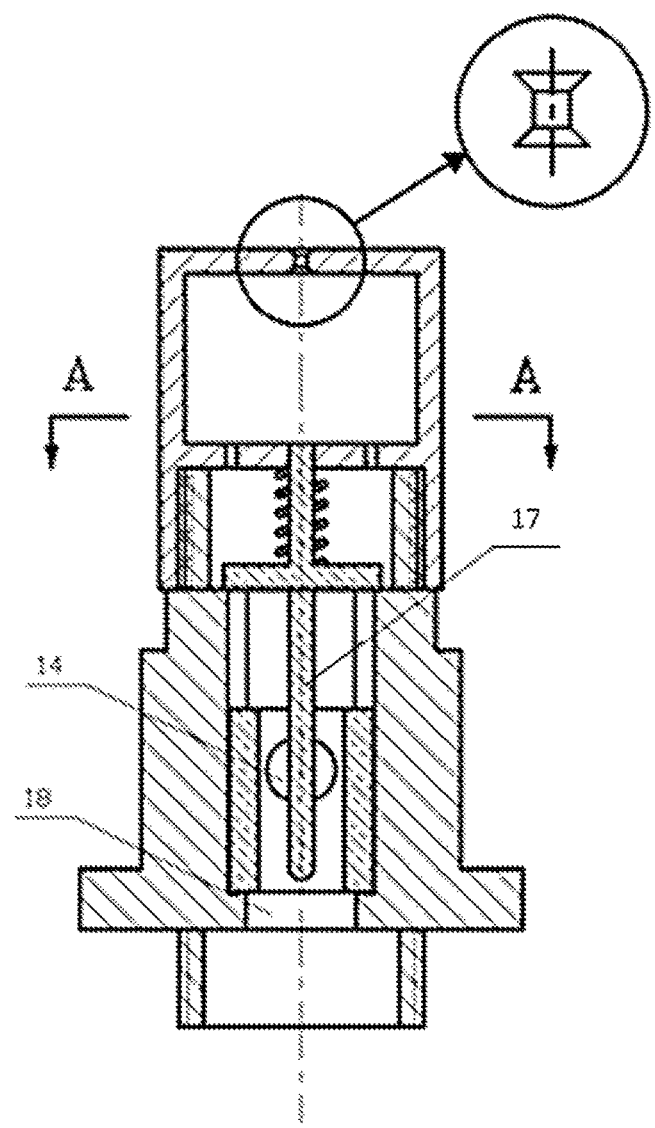
FIG. 4 is a schematic cross-sectional side view of the present disclosure.
Figure 5:
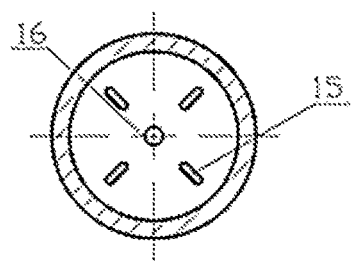
FIG. 5 is a schematic cross-sectional view taken along line A-A.
Figure 6:
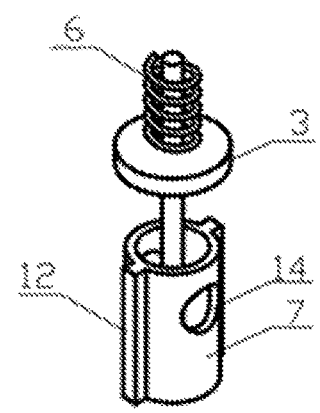
FIG. 6 is a schematic appearance diagram of a spring sleeve.

As shown in FIG. 1, FIG. 2, and FIG. 3, an embodiment provides a pressure self-controlled irrigation and pesticide application sprinkler for a micro-irrigation system, which includes a sprinkler body 1, a sprinkler cap 10, and a spring sleeve 7. As shown in FIG. 1, the sprinkler body 1 is a multi-stage hollow cylindrical structure. A bottom end of the sprinkler body 1 is connected to a water pipe 13 through a thread. A water flow in the water pipe 13 enters an inner cavity of the sprinkler body 1 through cylindrical flow passages 18. Flow guide holes 2 are provided on a sidewall of the sprinkler body 1. Symmetrical arc-shaped flow passages 8 are provided on an outer shell of the sprinkler body 1. An engagement recess is provided in the sprinkler body 1 to form a sliding pair with a protrusion 12 on an outer wall of the spring sleeve 7. As shown in FIG. 2 and FIG. 3, a bottom end of the sprinkler cap 10 is provided with a thread 9 connected to the sprinkler body 1, and a cylindrical rotary acceleration chamber 5 and a spring cavity 19 are provided in the sprinkler cap 10. As shown in FIG. 2 and FIG. 4, an upper end of the sprinkler cap 10 is provided with a spraying nozzle 4. As shown in FIG. 5, flow guide grooves 15 are provided on a bottom surface of the sprinkler cap 10, and a connecting rod movable hole 16 is provided inside the sprinkler cap 10. As shown in FIG. 2, FIG. 3, FIG. 4, and FIG. 6, the spring sleeve 7 is connected to the sprinkler body 1 through engagement of the engagement recess and the protrusion 12. The spring sleeve 7 is provided with a spring washer 3. The spring washer 3 is located on a connecting rod 17 in the spring sleeve. The spring sleeve moves up and down together with the spring washer 3. The spring sleeve 7 is connected to the sprinkler cap 10 through engagement of the connecting rod 17 and the connecting rod movable hole 16. The spring sleeve 7 is provided with symmetrical through holes 14. A diameter of each of the through holes is equal to a width of the arc-shaped flow passage 8 of the sprinkler body. A compressible spring 6 is arranged in the spring washer 3 and the sprinkler cap 10.

As shown in FIG. 2, when the present disclosure operates in a water spraying mode under a low-pressure condition (higher than 100 kPa and lower than 200 kPa), water flows into the sprinkler body 1. In this case, a pressure exerted by the water on the spring washer 3 is less than an elastic force of the compressible spring 6, and the water flows out of the flow guide holes 2 through the arc-shaped flow passages 8, hits the deflection surface 11, and is then ejected from two sides of the deflection surface in the form of an arc-shaped thin water layer to irrigate the roots of crops. As shown in FIG. 3, when the present disclosure operates in a mist spraying mode under a medium-pressure condition (higher than 200 kPa and lower than 500 kPa), water flows into the sprinkler body 1. In this case, the pressure exerted by the water on the spring washer 3 is greater than the elastic force of the compressible spring 6, and the compressible spring 6 is compressed. The spring washer 3 drives, through the cross-shaped connecting rod 17, the entire sleeve 7 to move upward and block the arc-shaped flow passages 8. The water is sprayed from the spraying nozzle 4 through the rotary acceleration chamber 5 to the leaves of crops. When the water pressure is reduced, the compressible spring 6 pushes the spring washer 3 back to the state shown in FIG. 3.

The above description is a preferred embodiment of the present disclosure, and the present disclosure is not limited to the above embodiment. Any modification, replacement, or modification made to the shape, structure, and features in the claims of the present disclosure without departing from the essence of the present disclosure falls within the scope of protection of the present disclosure.

What is claimed is:

1. A pressure self-controlled irrigation and pesticide application sprinkler for a micro-irrigation system, comprising a sprinkler body and a sprinkler cap, wherein an impact deflection surface is arranged at a joint between the sprinkler body and the sprinkler cap, a spring sleeve is mounted in an inner cavity of the sprinkler body, the spring sleeve is slidable on a surface of the inner cavity of the sprinkler body, a bottom of the spring sleeve is in communication with a water inlet of the sprinkler body, a plurality of arc-shaped flow passages are arranged on the sprinkler body, the arc-shaped flow passages are in communication with the inner cavity of the sprinkler body, a plurality of through holes are arranged on a side wall of the spring sleeve, a connecting rod is fixed inside the spring sleeve, a spring washer is arranged on the connecting rod, the spring washer is located at a water outlet of the sprinkler body, an upper end of the sprinkler cap is provided with a spraying nozzle, a cylindrical rotary acceleration chamber and a spring cavity are provided in the sprinkler cap, a connecting rod movable hole and a plurality of flow guide grooves are provided in the cylindrical rotary acceleration chamber, the connecting rod is slidably connected to the connecting rod movable hole, a compressible spring is arranged in the spring cavity, the compressible spring is nested on the connecting rod, and two ends of the compressible spring are positioned through the spring washer and a bottom end surface of the rotary acceleration chamber.

2. The pressure self-controlled irrigation and pesticide application sprinkler for the micro-irrigation system according to claim 1, wherein a flow guide hole is arranged at an outlet of each of the arc-shaped flow passages.

3. The pressure self-controlled irrigation and pesticide application sprinkler for the micro-irrigation system according to claim 1, wherein a central hole axis of each of the through holes is coplanar with a center line of each of the arc-shaped flow passages, and a diameter of each of the through holes is equal to a flow passage diameter of each of the arc-shaped flow passages.

4. The pressure self-controlled irrigation and pesticide application sprinkler for the micro-irrigation system according to claim 1, wherein an engagement recess is provided on a wall surface of the inner cavity of the sprinkler body, a protrusion is arranged on an outer wall surface of the spring sleeve, and the protrusion is located in the engagement recess.

5. The pressure self-controlled irrigation and pesticide application sprinkler for the micro-irrigation system according to claim 1, wherein water inlet end of the sprinkler body is connected to a water pipe through a thread.

6. The pressure self-controlled irrigation and pesticide application sprinkler for the micro-irrigation system according to claim 1, wherein a diameter of the spring washer is greater than a diameter of a flow passage of the water outlet of the sprinkler body.

\* \* \* \* \*